United States Patent
Jiang

(10) Patent No.: US 9,361,498 B2
(45) Date of Patent: Jun. 7, 2016

(54) OPTICAL COMMUNICATION USING DIFFERENTIAL IMAGES

(71) Applicant: Intel Corporation, Santa Clara, CA (US)

(72) Inventor: Yong Qually Jiang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,484

(22) PCT Filed: Aug. 6, 2013

(86) PCT No.: PCT/CN2013/080861
§ 371 (c)(1),
(2) Date: Dec. 26, 2013

(87) PCT Pub. No.: WO2015/017970
PCT Pub. Date: Feb. 12, 2015

(65) Prior Publication Data
US 2015/0205984 A1 Jul. 23, 2015

(51) Int. Cl.
*G06K 7/10* (2006.01)
*G06K 7/14* (2006.01)
*G06K 19/08* (2006.01)
*G06K 7/12* (2006.01)
*G06K 19/06* (2006.01)

(52) U.S. Cl.
CPC ............... *G06K 7/1095* (2013.01); *G06K 7/12* (2013.01); *G06K 7/1413* (2013.01); *G06K 7/1417* (2013.01); *G06K 7/1439* (2013.01); *G06K 7/1465* (2013.01); *G06K 19/0614* (2013.01); *G06K 19/06028* (2013.01); *G06K 19/06037* (2013.01); *G06K 19/06112* (2013.01); *G06K 19/08* (2013.01)

(58) Field of Classification Search
USPC .................................. 235/462.01–462.49, 454
See application file for complete search history.

(56) References Cited

U.S. PATENT DOCUMENTS

| 7,114,657 | B2 * | 10/2006 | Auslander | G06K 7/12 235/487 |
| 7,702,162 | B2 * | 4/2010 | Cheong | G06K 19/06037 235/494 |
| 8,807,435 | B2 * | 8/2014 | Cok | G06K 7/1447 235/462.01 |
| 8,915,450 | B2 * | 12/2014 | Simske | 235/494 |
| 2003/0123710 | A1 | 7/2003 | Nakazawa et al. | |
| 2004/0012569 | A1 | 1/2004 | Hara | |
| 2007/0295814 | A1 | 12/2007 | Tanaka et al. | |

FOREIGN PATENT DOCUMENTS

EP 2 239 686 A1 10/2010

OTHER PUBLICATIONS

International Search Report and Written Opinion received for PCT Patent Application No. PCT/CN2013/080861, mailed on May 28, 2014, 14 pages.

* cited by examiner

*Primary Examiner* — Christle I Marshall
(74) *Attorney, Agent, or Firm* — Green, Howard & Mughal, LLP

(57) ABSTRACT

Techniques related to optical communication including techniques for communicating barcodes using differential images.

19 Claims, 10 Drawing Sheets

OPTICAL COMMUNICATION USING DIFFERENTIAL IMAGES

BACKGROUND

In some examples, optical communication may include providing a barcode such as a linear (e.g., one-dimensional (1D)) barcode or matrix (e.g., two-dimensional (2D)) barcode, which may be encoded with information and read using a reader or image capture device or the like. In some instances, producing, capturing, and/or decoding a barcode may not be stable due to noise caused by over/under exposure, ambient light, shadows, or reflections, or the like. Such instability may be particularly problematic for 2D barcodes and/or for barcodes presented via a display screen such as, for example, a liquid-crystal display (LCD) display. For example, when a barcode is presented via a display screen, reflections may be stronger than when a barcode is presented via paper or the like, particularly in outdoor environments, bright areas, or dark areas, or the like. Such display screens may include display screens for mobile devices or for digital signage or the like.

Further, color barcodes such as color 2D barcodes, which may offer greater data capacity than black and white barcodes, may have instability due to the reasons described above and additional instability due to color shifting during the production and capturing of the 2D color image, for example.

Current techniques to deal with such problems include using local adaptive thresholds to help reduce noise. Such techniques may help with low amounts of noise but not with medium or high levels of noise, for example. Further, current techniques may deal with color shifting by presenting all possible colors in a reserved area of the barcode, which may reduce the capacity of the barcode.

As it is desirable for barcodes to contain more data and as communicating via display screens becomes more prevalent, it may be advantageous to accurately and predictably produce, capture, and decode barcodes.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures.

DETAILED DESCRIPTION

Figure 1:
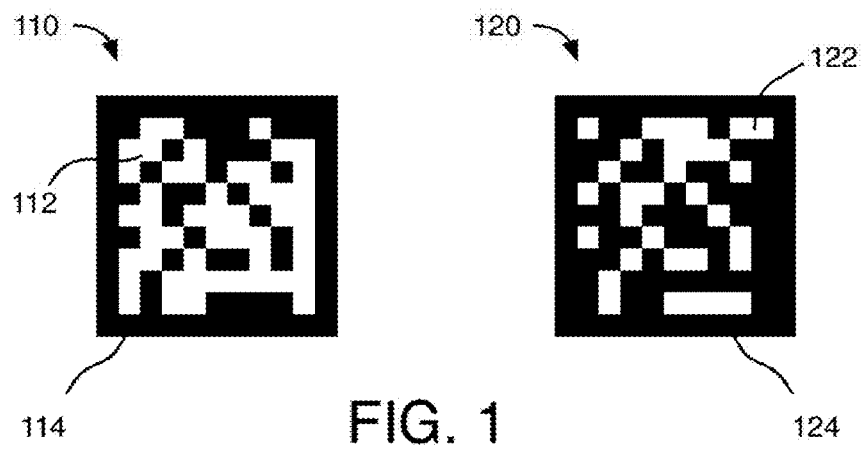
FIG. 1 is an illustrative diagram of an example barcode image and an example alternative image.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein, may be implemented in hardware, firmware, software, or any combination thereof. The material disclosed herein may also be implemented instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Furthermore, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to optical communication including techniques for communicating barcodes using differential images.

As described above, it may be desirable to accurately and predictably produce, capture, and decode barcodes. As will be described in greater detail below, in some examples, input data may be encoded to generate barcode image data. Alternative, complementary, or differential barcode image data may be generated and associated with the barcode image data. In various examples, the alternative barcode image data may represent a negative of the barcode image data, a pure black image, a transpose of the barcode image data, or the like. The barcode image data may be presented as a barcode image and the alternative image data may be presented as an alternative image via a display device. In some examples, the barcode image and the alternative image may be presented in the same are of the display device by switching between the images over time or alternating the images over time or the like.

The barcode image and the alternate image may be captured at a capture device such as a camera or the like to generate captured barcode image data and captured alternate image data. An operation may be performed on the captured barcode image data and the captured alternate image data to generate comparative barcode image data. In various examples, the operation may include an absolute value difference, a subtraction, an addition, a multiplication, or the like. In some examples, barcode output data may be generated based on the comparative barcode image data.

As discussed, in some examples, due to the environment of the display (e.g., outdoors, in glare, in a shadow, or the like) or the display itself or the like, the captured image may include bright spots, dark spots, color shifts, or other types of noise or the like, which may cause the barcode image data to be improperly decoded. In such examples, comparative barcode image data may reduce or remove such noise to allow for proper decoding. Such comparative or differential techniques may improve the rate at which barcodes presented with such noise are properly decoded.

FIG. 1 is an illustrative diagram of an example barcode image 110 and an example alternative barcode image 120, arranged in accordance with at least some implementations of the present disclosure. As shown, barcode image 110 may include multiple barcode elements 112 and an optional border 114. Further, as shown, in some examples, barcode image 110 may include a black and white matrix (e.g., two-dimensional (2D)) barcode image. In some examples, barcode image 120 may include a linear (e.g., one-dimensional (1D)) barcode image. In some examples, barcode image 120 may include a color barcode image. Further, in some examples, barcode image 120 may include test areas, registration areas, or the like, which are not shown for the sake of clarity of presentation.

In various examples, input data may be encoded into barcode image 120 using known techniques. In some examples, individual barcode elements 112 may be encoded such that they may provide binary encoding (e.g., black is one and white is zero or vice versa). In some examples, individual barcode elements 112 may be encoded based at, least in part on their size. As discussed, in some examples, barcode elements 112 may be color and may be encoded based on their color and/or size. In some examples, color encoding may provide 3-bits associated with three color channels. For example, in a red green blue (RGB) color space, each channel may be encoded with a 0 or 255 (the max and min for each channel) to encode three bits of data. For example, a 111 bit pattern may be encoded as (255, 255, 255)=White, a 100 bit pattern may be encoded as (255, 0, 0)=Red, a 010 bit pattern may be encoded as (0, 255, 0)=Green, and so on. In other examples, other colors or other color spaces may be used for the encoding. Although discussed herein with respect to black and white encoding and/or RGB encoding, the techniques discussed herein are not so limited and may be practiced with other encoding techniques and/or color spaces.

As shown in FIG. 1, alternative barcode image 120 may include a complementary image to barcode image 110. For example, image 120 may be selected or generated based on a technique for accurately and predictably communicating barcode image 110. As shown, in some examples, alternative barcode image 120 may include barcode elements 122 and border 124. In some examples, as shown, alternative barcode image 120 may be a negative of barcode image 110. In the illustrated black and white image, a negative of barcode image 110 may include a white element 122 in place of black elements 112 and black element(s) 122 in place of white element(s) 112, for example. In the example of a color barcode image, a negative of barcode image 110 may provide for colors from barcode image 110 reversed into their respective complementary colors in alternative barcode image 120. In some examples, alternative barcode image 120 may be a solid or pure color such as, for example, pure black. For example, a pure black alternative image may provide for highlighting and reducing the effects of glare using the decoding techniques discussed herein. In other examples, alternative barcode image 120 may be pure color such as white, red, green, or blue, or the like.

As is discussed further herein, barcode image 110 and alternative barcode image 120 may be presented by a display device and captured via an image capture device and decoded. As discussed, in some examples, noise in the presenting and capturing of barcode image 110 may cause difficulty in decoding barcode image 110.

Figure 2:
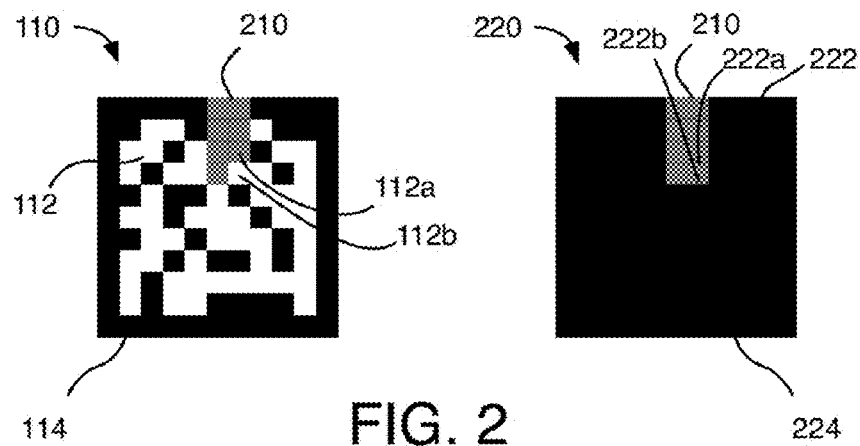
FIG. 2 is an illustrative diagram of an example barcode image and an example alternative image each having an example reflection.

FIG. 2 is an illustrative diagram of an example barcode image 110 and an example alternative barcode image 220 each having an example reflection 210, arranged in accordance with at least some implementations of the present disclosure. As shown, in the example illustrated in FIG. 2, alternative barcode image 220 may be a pure black alternative image. In some examples, a pure black alternative barcode image 220 may include black barcode elements 222 and a black border 224, as illustrated. As shown, reflection 210 may cause a portion of barcode elements 112 and border 114 to lighten such that for, example, the portion of barcode elements 112 (including barcode element 112a) and border 114 that were intended to be black may be presented and captured as gray or light gray or the like. As shown, the portion of barcode elements 112 meant to be white (including barcode element 112b) may stay substantially white in such an example. Similarly, reflection 210 may cause a portion of alternative barcode image 220 intended to be black to be presented and captured as gray.

Although illustrated with respect to a reflection on a black and white barcode, such imperfections or noise may include a wide range of noise such as for example shadows, glare, color shifts, over/under exposure, discolored ambient light, or the like.

Figure 3:
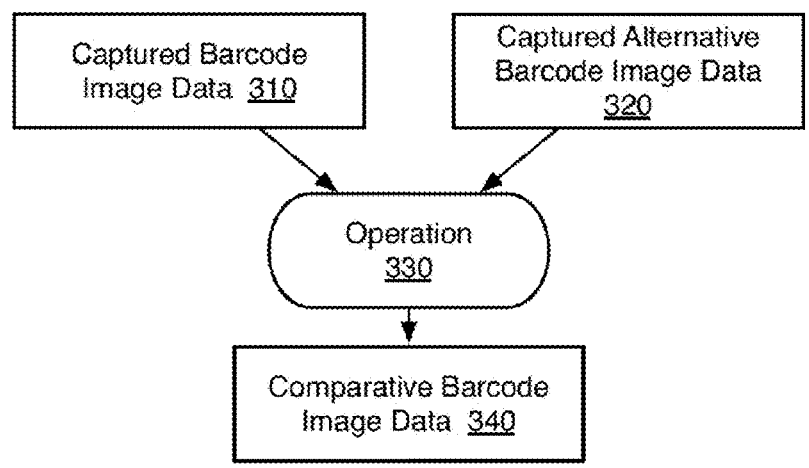
FIG. 3 is an example method for performing an operation on captured barcode image data and associated captured alternative image data to generate comparative barcode image data.

FIG. 3 is an example method for performing an operation 330 on captured barcode image data and associated captured alternative barcode image data 320 to generate comparative barcode image data, arranged in accordance with at least some implementations of the present disclosure. As is discussed further herein, a barcode image (e.g., barcode image 110) and an alternative image (e.g., alternative barcode image 120 or 220) may be presented by a display device and captured by an image capture device. The image capture device may generate captured barcode image data 310 associated with the barcode image and captured alternative barcode image data 320 associated with the alternative image. Also as discussed the captured image and captured image data may have noise due to a variety of factors in the presentation and capture of an image. Based on an operation 330 performed on captured barcode image data 310 and captured alternative barcode image data 320, such imperfections and noise may be reduced or removed in the generated comparative barcode image data 340 such that captured barcode image data 340 may be properly decoded.

In various examples, operation 330 may include adding captured barcode image data 310 and captured alternative barcode image data 320, multiplying captured barcode image data 310 and captured alternative barcode image data 320, taking an absolute value difference between captured barcode image data 310 and captured alternative barcode image data 320, subtracting captured barcode image data 310 and captured alternative barcode image data 320, determining positive numbers from a subtraction of captured barcode image data 310 from captured alternative barcode image data 320, or determining positive numbers from a subtraction of captured alternative barcode image data 320 from captured barcode image data 310, or the like. Operation 330 may remove noise from captured barcode image data 310 using captured alternative barcode image data 320 as a baseline or as a comparative data set, or the like.

Using the example illustrated in FIG. 2, a barcode element 112a, representing a 0 may be encoded in the RGB color space as (0, 0, 0)=Black in barcode image data associated with barcode image 110. However, as discussed, after presentation, capture and decode, the barcode element may be may be decoded as, for example, (110, 120, 90)=Gray in captured barcode image data 310. For example, such a decoding may be mistakenly decoded as White (e.g., representing a 1; White=(255, 255, 255)) using previous techniques based only on barcode image data 310. As discussed, such noise may be caused, for example, by reflection 210. In some examples, using a pure black alternative barcode image 220, associated barcode element 222a may be represented as (0, 0, 0)=Black in the pure black alternative barcode image 220 and, after presentation, capture and decode, pure black barcode element may be decoded as, for example, (105, 125, 90) in captured alternative barcode image data 320.

In such an example, operation 330 may include an absolute value difference between captured barcode image data 310 and captured alternative barcode image data 320. For example, the absolute value difference may be |(110, 120, 90)−(105, 125, 90)|=(15, 5, 0) for barcode element 112a and associated barcode element 222a, which may indicate barcode element 112a was encoded as Black. For example, the absolute value difference of between the gray of barcode element 112a caused by reflection 210 as captured and decoded and the gray of associated barcode elements 222a also impacted by reflection 210 may substantially cancel out (e.g., be substantially close to zero) to a proper decoding of Black for the impacted elements.

In contrast, for barcode element 112b, which may be encoded as White=(255, 255, 255), the captured and decoded value may be (255, 255, 255) in captured barcode image data 310. For associated barcode element 222b alternative barcode image 220, the captured and decoded value may be (105, 125, 90) (e.g., as above) in captured alternative barcode image data 320. If operation 330 of an absolute value difference between the barcode image data and the alternative pure black image data is performed for barcode element 112b and associated barcode element 222b, the absolute value difference may be |(255, 255, 255)−(105, 125, 90)|=(140, 130, 165), which may be decoded as White. In some examples, a threshold may be applied such that values over the threshold may be decoded as White and values below the threshold may be decoded as Black. In some examples, the threshold may be about 15 or 25 or 35 or the like for each channel of the RGB color space.

In another example (not illustrated), in a black and white barcode, a barcode element representing a 1 may be encoded in the RGB color space as (255, 255, 255)=White in barcode image data. However, after presentation, capture and decode, the barcode element may be may be decoded as, for example, (80, 90, 60)=Gray in captured barcode image data 310, which may be mistakenly decoded as Black (e.g., representing a 0; Black=(0, 0, 0)). Such noise may be caused, for example, by underexposure in presenting the barcode image and limited dynamic range of an image capture device. In some examples, using a negative alternative image, the negative barcode element may be represented as (0, 0, 0)=Black in the negative alternative image. After presentation, capture and decode, the negative barcode element may be decoded as, for example, (50, 55, 40) in captured alternative barcode image data 320 again due to limitations in the presenting and capturing hardware or the like.

For example, operation 330 may be a difference between the barcode image and the alternative image may be performed in such examples such that the difference for the discussed barcode image elements and associated alternative image element may be (80, 90, 60)−(50, 55, 40)=(30, 35, 20), which may indicate the barcode element is White. For example, a difference of (30, 35, 20) may indicate a relatively strong difference between the presented and captured barcode image element (White) and the presented and captured negative alternative barcode image element (Black). In various examples, difference thresholds such as for example, a threshold of about 15 or 25 or 35 or the like for each channel of the RGB color space, may be used to determine the decoding value.

Further, such techniques may reduce noise due to color shifts. For example, in a color barcode example (not illustrated), a barcode element representing 3-bits of data in a bit pattern of 001 may be encoded as 0, 0, 1 and (0, 0, 255)=Blue in RGB color space. However, after presentation, capture and decode, the barcode element may be may be decoded as, for example, (30, 120, 180)=Greenish Blue Aqua in captured barcode image data 310, which may be mistakenly decoded as Green, for example. In some examples, using a negative alternative image, the negative barcode element may be represented as (255, 255, 0)=Yellow in the negative alternative image. After presentation, capture and decode, the negative barcode element may be decoded as, for example, (220, 255, 5)=Greenish Yellow in captured alternative barcode image data 320, again due to limitations in the presenting and capturing hardware or color shifts or the like.

For example, operation 330 may determine positive values of a difference between captured barcode image data 310 and captured alternative barcode image data 320 may be performed (and set negative values to zero). For example, the operation to determine positive values of the difference may be PosValues[(30, 120, 180)−(220, 255, 5)]=(0, 0, 175), which may indicate the barcode element is Blue and properly decoded to the bit pattern 001, as desired. For example, determining positive values of a difference between captured barcode image data 310 and captured alternative barcode image data 320 may provide a baseline for any color shifts.

In the illustrated example of FIG. 2 and the discussed examples, the image data representing two images (e.g., a barcode image and an alternative image) may be operated on to determine comparative barcode image data using an absolute value difference, a difference, and an operation that determines positive values of a difference between the barcode image data and the alternative image data (and sets negative values to zero). In various other examples, the operation may include adding the image data, multiplying the image data, an operation that determines positive values of a difference between the alternative image data and the barcode image data (and sets negative values to zero), or the like. Further, in some examples, various operations may be performed on either the barcode image data or the alternative image data prior to operation 330 such as transposing, rotating, applying a threshold, data smoothing or the like.

Further still, in some examples, the image data representing more than two images may be used. In some examples, multiple different alternative images may be provided. In other examples, multiple duplicative images may be captured and averaged or the like prior to an operation being performed. Further, multiple operations may be performed on different portions of an image. For example, some portions of an image may be decoded with a first operation while the first operation may not be suitable to decode another portion(s) of the image and a different operation may be performed on the other portion(s) to decode them. Also, if a first operation fails in decoding barcode image data, a second or additional different operations may be performed on the barcode image data and alternative image data in an attempt to decode the barcode data or the same (e.g., first) operation may be attempted on a different barcode image and alternative image combination. As is discussed below, in some examples, the barcode image and alternative image may be provided numerous times (e.g., in an alternating pattern) and attempts may be made to decode various barcode image and alternative image combinations.

Figure 4:
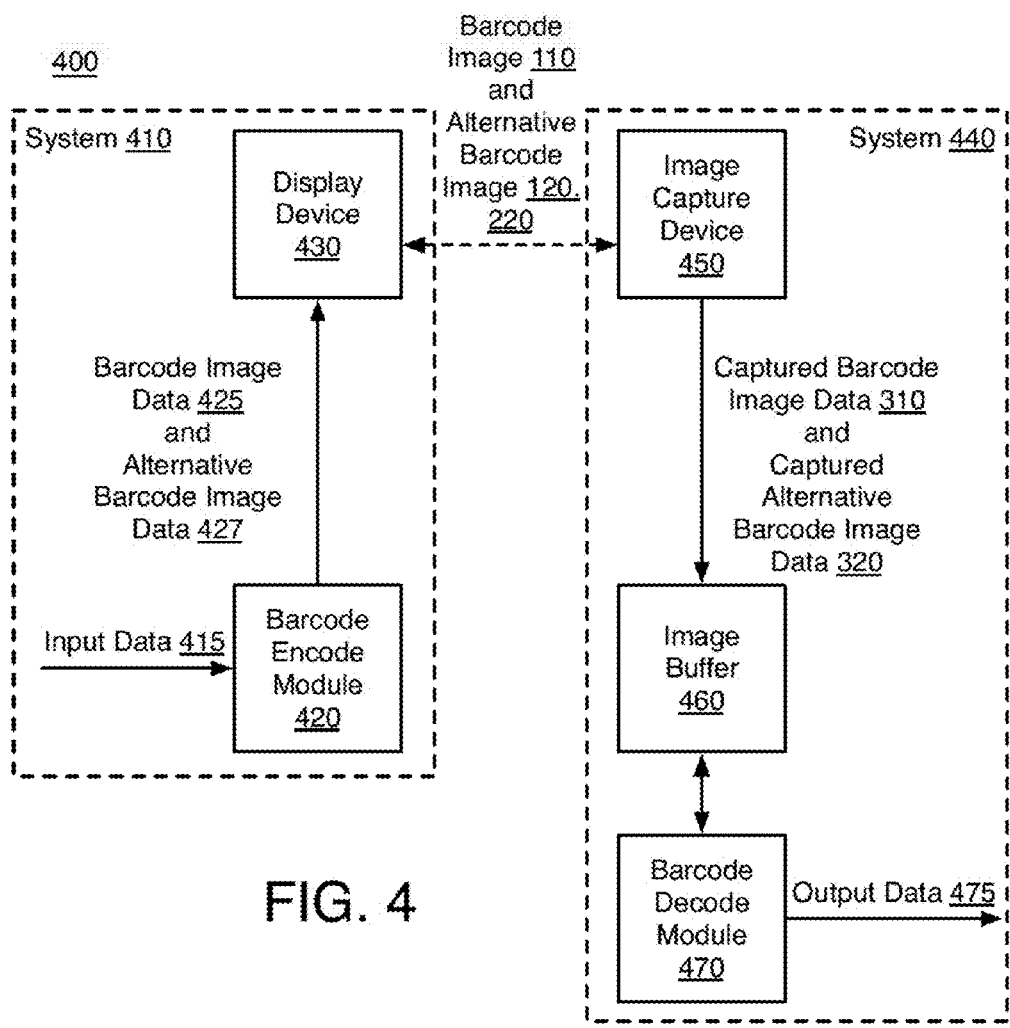
FIG. 4 is an illustrative diagram of example system for encoding and displaying a barcode image and an alternative barcode image and for capturing and decoding the barcode image and the alternative barcode image.

FIG. 4 is an illustrative diagram of example system 400 for encoding and displaying barcode image 110 and alternative barcode image 120, 220 and for capturing and decoding barcode image 110 and an alternative barcode image 120, 220, arranged in accordance with at least some implementations of the present disclosure. As shown, system 400 may include a system 410 (e.g., an encode and display system) and a system 440 (e.g., a capture and decode system). As is discussed further herein, system 410 may encoded input data 415 to generate barcode image data 425 and may generate alternative barcode image data 427. Barcode image data 425 and/or alternative barcode image data 427 may be any data formatted to display barcode image 110 and/or alternative barcode image 120, 220 via a display device 430. Further, system 440 may capture barcode image 110 and/or alternative barcode image 120, 220 via an image capture device 450 to generate captured barcode image data 310 and/or captured alternative barcode image data 320, which may be stored via an image buffer 460, for example. System 440 may decode captured barcode image data 310 and/or captured alternative barcode image data 320 to generate output data 475, as is discussed further herein.

While FIG. 4 illustrates system 400 as employing particular modules, various other modules or components not depicted in FIG. 4 for the sake of clarity may also be utilized in accordance with the present disclosure. Further, the present disclosure is not limited to the particular components illustrated in FIG. 4 and/or to the manner in which the various components of system 400 are arranged. Various components of the systems described herein may be implemented in software, firmware, and/or hardware and/or any combination thereof. For example, various components of system 400 may be provided, at least in part, by hardware of a computing System-on-a-Chip (SoC) such as may be found in a computing system such as, for example, a mobile phone.

Further, it may be recognized that system 410 may be associated with and/or provided by a content provider system or content display system. It may also be recognized that system 440 may be associated with a content receiver system. In various examples, system 410 and/or system 440 may include a computing device (e.g., a desktop computer, laptop computer, tablet computer, convertible laptop, mobile phone or the like) that are physically distinct from one another. For example, in some implementations system 410 may include a consumer's mobile device and system 440 may include a merchant's device such that a consumer may display a barcode indicating store credits or the like for the merchant to capture, decode and process. In other implementations, system 410 may include an advertiser's display and system 440 may include a consumer's mobile device such that the consumer may capture a barcode indicating an advertisement or a website for an advertisement or the like. In various examples, system 410 and system 440 may be configured in a wide range of implementations to provide optical communications between system 410 and system 440.

As shown in FIG. 4, system 410 may encode input data 415 via a barcode encode module 420. Input data 415 may include any data such as advertising data, product data, text data, Internet link data (e.g., uniform resource locator(s)), or the like. Encode module 420 may encode input data 415 using known techniques to generate barcode image data 425. As discussed, barcode image data 425 may be any data suitable for display via system 410. Also as shown, barcode encode module may generate alternative barcode image data 427. In some examples, barcode encode module 220 may generate alternative barcode image data 427 each time barcode image data 425 is generated. In other examples, alternative barcode image data 427 may be generated once and used with multiple barcode image data. In other examples, such as for example, when pure color alternative barcode image data 427 are implemented, barcode encode module may not need to generate alternative barcode image data 427 and alternative barcode image data 427 may be retrieved from an image buffer (not shown in system 410 for the sake of clarity of presentation) or the like.

As shown in FIG. 4, barcode image 110 associated with barcode image data 425 and alternative barcode image 120, 220 associated with alternative barcode image data 427 may be displayed via display device 430. Barcode image 110 and alternative barcode image 120, 220 may be displayed using any suitable technique or techniques. In some examples, barcode image 110 and alternative barcode image 120, 220 may be displayed on a same or similar portion of display device 430 such that any noise (which the described techniques may reduce or remove) may be substantially duplicated on both barcode image 110 and alternative barcode image 120, 220. In some examples, barcode image 110 and alternative barcode image 120, 220 may be displayed alternatingly on display device 230 such that first barcode image 210 is displayed and then alternative barcode image 120, 220 is displayed or such that first alternative barcode image 120, 220 is displayed and then barcode image 110 is displayed.

In some examples, barcode image 110 may be a static barcode image such that a single frame (e.g., image) of data is to be communicated between system 410 and system 440. In such examples, barcode image 110 and alternative barcode image 120, 220 may be alternatingly displayed at a frame rate such as 10 frames per second, or the like. In some examples, barcode image 110 and alternative barcode image 120, 220 may be alternatingly displayed at one half of a capture rate implemented via image capture device 450 as is discussed further below. In other examples, barcode image 110 may be a static dynamic barcode image such that a multiple frames (e.g., images) of data are to be communicated between system 410 and system 440. In such examples, barcode image 110 and alternative barcode image 120, 220 may represent one frame of multiple frames. In such examples, barcode image 110 (represented as I-1) and alternative barcode image 120, 220 (represented as AI-1) may be one of several frames or images such as, for exemplary purposes, three frames or images (with the second and third represented as I-2 and I-3, respectively, and having, in some examples, alternative images AI-2 and AI-2).

In some dynamic barcode examples, the dynamic barcode may be presented by displaying barcode image 110, displaying alternative barcode image 120, 220, and subsequently displaying any remaining images of the multiple images on the same area of display device 430. Continuing the above example, the dynamic barcode may be presented by displaying, in order: I-1, AI-1, I-2, AI-2, I-3, and AI-3, and repeating, if necessary, such a sequence as needed. In some other dynamic barcode examples, the dynamic barcode may be presented by displaying barcode image 110, displaying one or more images associated with any remaining images of the plurality of images, and subsequently displaying alternative barcode image 120, 220 on the same area of display device 430. Again continuing the above example, in such examples, the dynamic barcode may be presented by displaying, in order: I-1, I-2, I-3, AI-1, AI-2, and AI-3, and repeating, if necessary, such a sequence as needed.

As discussed, in various examples, barcode image and alternative barcode image 120 may be displayed alternatingly and/or using various sequences. In some examples, such display may be provided in a specification or other standard that may be provided for operation of system 210 and/or system 240.

As shown, barcode image 110 and alternative barcode image 120, 220 may be captured at image capture device 450 to generate captured barcode image data 310 and captured alternative barcode image data 320, as discussed with respect to FIG. 3. Image capture device 450 may include any device capable of capturing barcode image 110 and alternative barcode image 120, 220 such as for example, a camera or a scanner or the like. In some examples, captured barcode image data 310 and captured alternative barcode image data 320 may be stored via image buffer 460. Image buffer 460 may include any memory device such as, for example, a random access memory device or a block or portion of a random access memory device. Image buffer 460 may be configured to receive, store, and transmit captured barcode image data 310 and captured alternative barcode image data 320. For example, image buffer may receive captured barcode image data 310 and captured alternative barcode image data 320 from image capture device 250, store captured barcode image data 310 and captured alternative barcode image data 320, and transmit captured barcode image data 310 and captured alternative barcode image data 320 to barcode decode module 470 (or allow barcode decode module access to captured barcode image data 310 and captured alternative barcode image data 320).

As shown in FIG. 4, barcode decode module 470 may receive barcode image data 310 and captured alternative barcode image data 320 and generate output data 475. For example, barcode decode module 470 may perform operation 330 on barcode image data 310 and captured alternative barcode image data 320 to generate comparative barcode image data 340 and barcode decode module 470 may generate output data 475 based on comparative barcode image data 340. In some examples, output data 475 may match or substantially match input data 415 upon a successful encode, display, image capture, and decode as discussed herein.

In some examples, decoding output data 475 based on comparative barcode image data 340 may include one or more operations such as applying a denoise operation to comparative barcode image data 340, binarizing comparative barcode image data 340 on one or more channels (e.g., the channels may include a black and white channel or multiple channels such as a red channel, a green channel, and a blue channel, or the like) locating code areas in comparative barcode image data 340, and/or decoding comparative barcode image data 340 to generate output data 475 or decoded barcode data. For example, decoded barcode data may be validated and, if validated, output data 475 matching the decoded barcode data may be transmitted by barcode decode module 470. If the decoded barcode data is not valid, subsequent processing may be performed in an effort to decode receive barcode image data 310 and captured alternative barcode image data 320, as is discussed further herein.

As discussed with respect to FIG. 4 and as will be discussed in greater detail below, a system, such as a computer-implemented system may be used to perform some or all of the various operations discussed herein with respect to FIGS. 1-3 and elsewhere herein.

Figure 5:
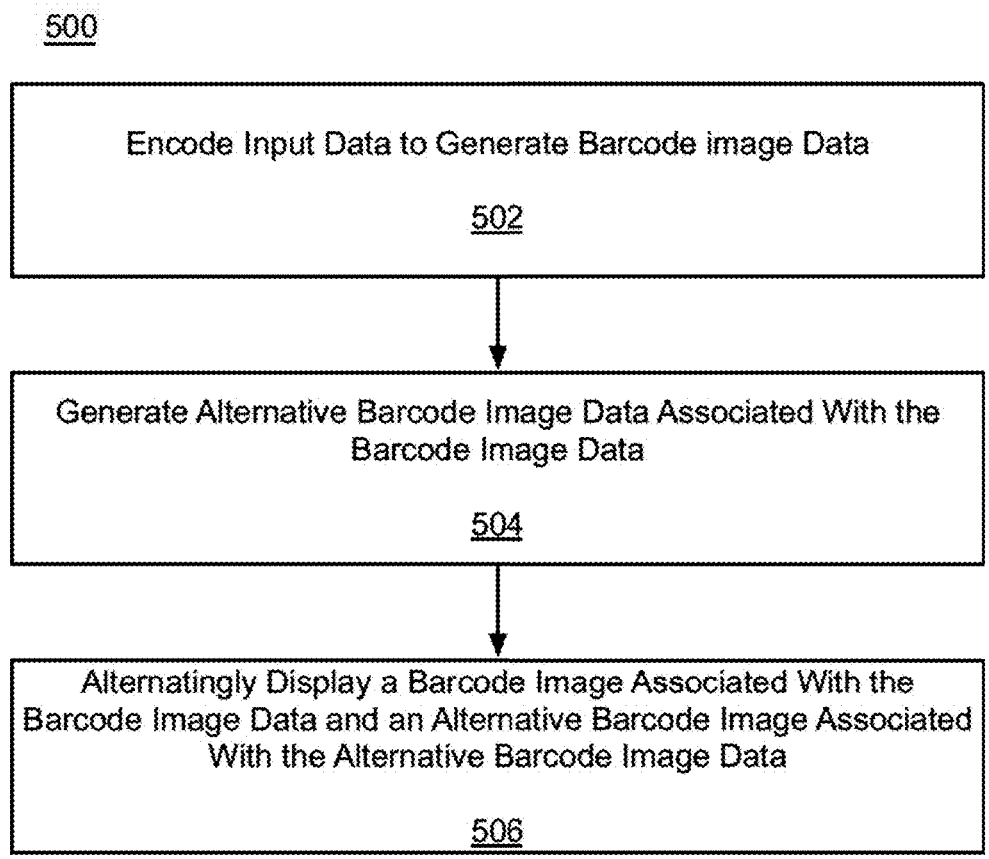
FIG. 5 is a flow chart illustrating an example process.

FIG. 5 is a flow chart illustrating an example process 500, arranged in accordance with at least some implementations of the present disclosure. In some examples, process 500 may provide a computer-implemented method for generating barcode images. In the illustrated implementation, process 500 may include one or more operations, functions or actions as illustrated by one or more of operations 502, 504, and/or 506. By way of non-limiting example, process 500 will be described herein with reference to operations discussed with respect to FIGS. 1-3 above and example system 400 as discussed herein.

Process 500 may be utilized as a computer-implemented method for providing generating barcode images. Process 500 may begin at operation 502, "Encode Input Data to Generate Barcode image Data", where input data may be encoded to generate barcode image data. For example, input data 415 may be encoded by barcode encode module 420 to generate barcode image data. Input data 415 may include any data suitable for encoding in a barcode image such as text data or the like.

Processing may continue from operation 502 to operation 504, "Generate Alternative Barcode Image Data Associated With the Barcode Image Data", where alternative barcode image data associated with the barcode image data may be generated. For example, the alternative barcode image data may be different than and complementary to the barcode image data. For example, barcode encode module 420 may generate alternative barcode image data 427.

Processing may continue from operation 504 to operation 506, "Alternatingly Display a Barcode Image Associated With the Barcode Image Data and an Alternative Barcode Image Associated With the Alternative Barcode Image Data", where a barcode image associated with the barcode image data and an alternative barcode image associated with the alternative barcode image data may be alternatingly displayed via a display device. For example, barcode image 110 and alternative barcode image 120, 220 may be alternatingly displayed via display device 430 as discussed herein.

As shown in FIG. 5, in some examples, operations 902-906 may be performed serially. However, as discussed herein, the operations of FIG. 5 may be performed in another order and some operations may be skipped entirely. Further, as described, the operations of FIG. 5 may be utilized to encode input data and display a barcode image and an alternative barcode image. In some examples, further operations may be performed to encode input data and display a barcode image and an alternative barcode image.

Figure 6:
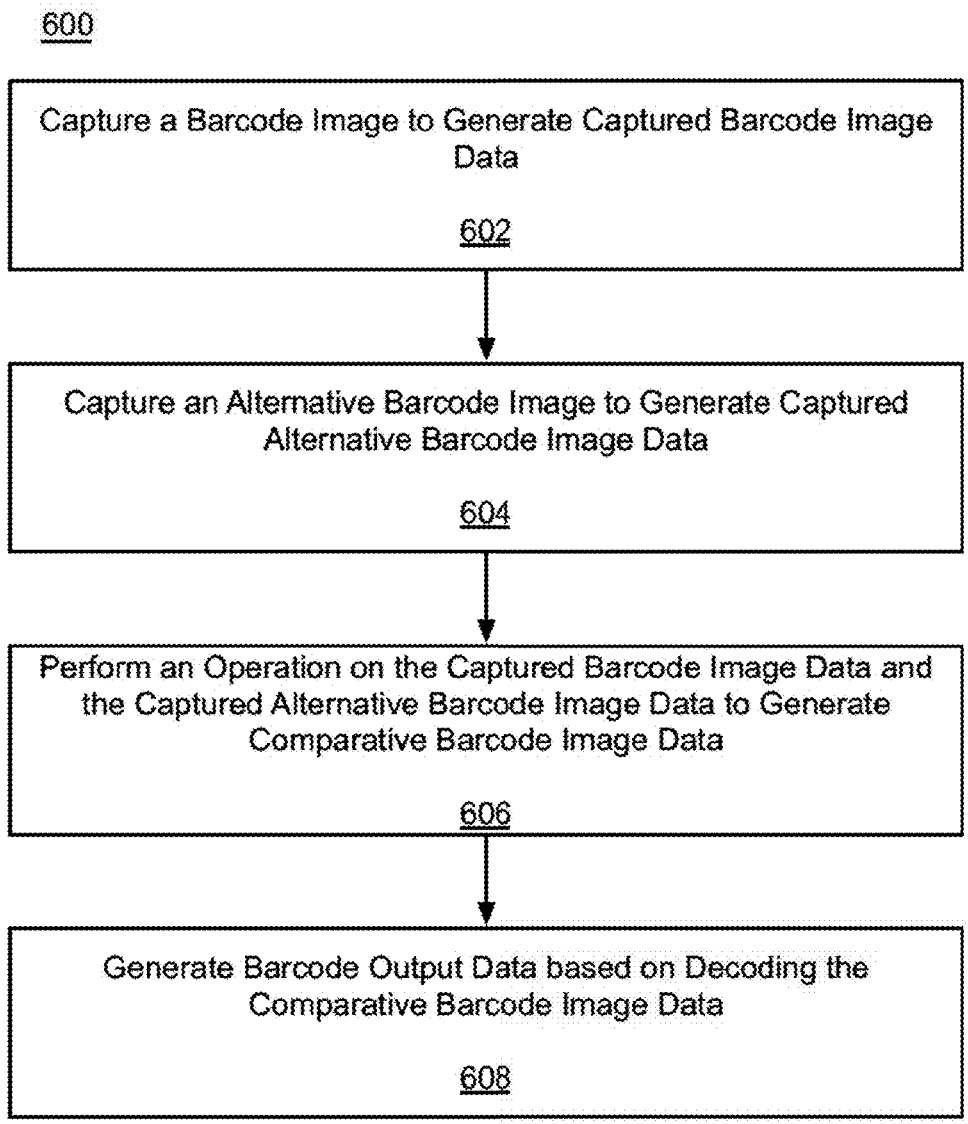
FIG. 6 is a flow chart illustrating an example process.

FIG. 6 is a flow chart illustrating an example process 600, arranged in accordance with at least some implementations of the present disclosure. In some examples, process 600 may provide a computer-implemented method for decoding barcode images. In the illustrated implementation, process 600 may include one or more operations, functions or actions as illustrated by one or more of operations 602, 604, 606, and/or 608. By way of non-limiting example, process 600 will be described herein with reference to operations discussed with respect to FIGS. 1-3 above and example system 400 as discussed herein.

Process 600 may be utilized as a computer-implemented method for decoding barcode images. Process 600 may begin at operation 602, "Capture a Barcode Image to Generate Captured Barcode Image Data", where a barcode image may be captured to generate barcode image data. For example, barcode image 110 may be captured by image capture device 450 to generate captured barcode image data 310.

Processing may continue from operation 602 to operation 604, "Capture an Alternative Barcode Image to Generate Captured Alternative Barcode Image Data", where an alternative barcode image may be captured to generate alternative barcode image data. For example, the alternative barcode image data may be associated with the barcode image data and the alternative barcode image data may be different than the barcode image. For example, alternative barcode image 120, 220 may be captured by image capture device 450 to generate captured alternative barcode image data 320. In some examples, captured alternative barcode image data 320 may be representative of a negative image of barcode image 110 or captured alternative barcode image data 320 may be representative of a pure black image or the like.

Processing may continue from operation 604 to operation 606, "Perform an Operation on the Captured Barcode Image Data and the A Captured Alternative Barcode Image Data to Generate Comparative Barcode Image Data", where an operation may be performed on the barcode image data and the alternative barcode image data to generate comparative barcode image data. For example, barcode decode module 470 may perform operation 330 on captured barcode image data 310 and captured alternative barcode image data 320 to generate comparative barcode image data 340.

Processing may continue from operation 606 to operation 608, "Generate Barcode Output Data based on Decoding the Comparative Barcode Image Data", where barcode output data may be generated based at least in part on decoding the comparative barcode image data. For example, barcode decode module 470 may generate output data 475 based on decoding comparative barcode image data 340.

As shown in FIG. 6, in some examples, operations 602-608 may be performed serially. However, as discussed herein, the operations of FIG. 6 may be performed in another order (e.g., operations 602 and 604 may be performed in the opposite order) and some operations may be skipped entirely. Further, as described, the operations of FIG. 6 may be utilized to decode barcode images. In some examples, further operations may be performed to decode barcode images, as shown below with respect to either FIGS. 7 and 8.

Figure 7:
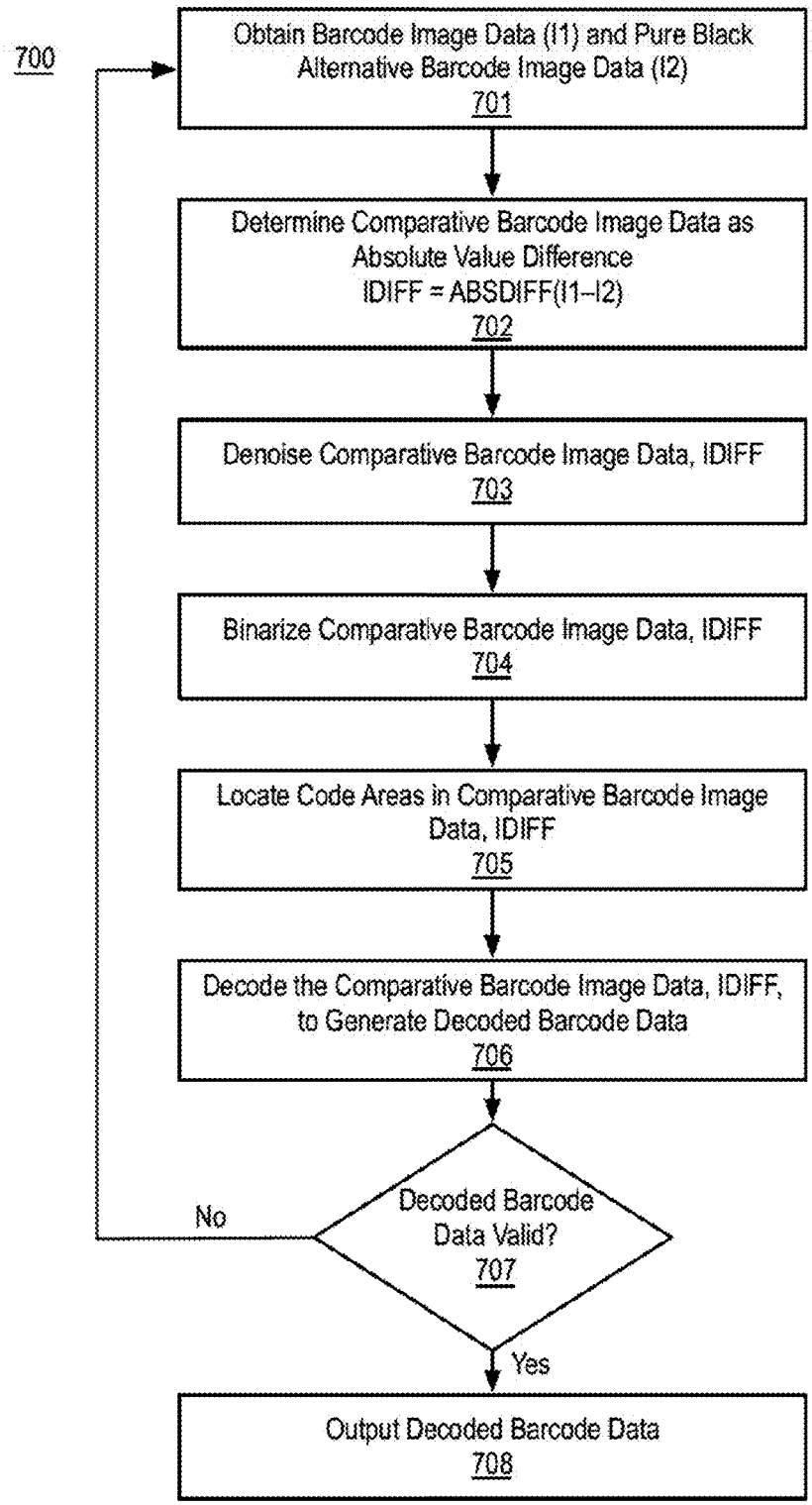
FIG. 7 is a flow chart illustrating an example process.

For example, FIG. 7 describes operations performed with respect to decoding barcode images. FIG. 7 is a flow chart illustrating an example process, arranged in accordance with at least some implementations of the present disclosure. In some examples, process 700 may provide a computer-implemented method for decoding barcode images. In the illustrated implementation, process 700 may include one or more operations, functions or actions as illustrated by one or more of operations 701, 702, 703, 704, 705, 706, 707, and/or 708. By way of non-limiting example, process 700 will be described herein with reference to operations discussed with respect to FIGS. 1-4 and 6 and example system 400 as discussed herein.

Process 700 may be utilized as a computer-implemented method for decoding barcode images. For example, process 700 may be utilized as a computer-implemented method for decoding barcode images when the alternative barcode image is a pure black alternative image. In such examples, the barcode image may be either a black and white barcode or a color barcode, as discussed herein. Process 700 may begin at operation 701, "Obtain Barcode Image Data (I1) and Pure Black Alternative Barcode Image Data (I2)", where barcode image data and pure black alternative barcode image data may be obtained. For example, barcode image 110 and alternative barcode image 220 may be captured via image capture device 450 to generate captured barcode image data 310 and captured alternative barcode image data 320. Although described as "pure black", the pure black barcode image data may include noise due to glare or reflections or the like as discussed herein.

Processing may continue from operation 701 to operation 702, "Determine Comparative Barcode Image Data as Absolute Value Difference IDIFF=ABSDIFF(I1−2)", where comparative barcode image data may be determined. For example, barcode decode module 470 may perform operation 330 on captured barcode image data 310 and captured alternative barcode image data 320 to generate comparative barcode image data 340 such that operation 330 includes an absolute value difference given as IDIFF=ABSDIFF(I1−I2), where IDIFF may be the comparative barcode image data and ABSDIFF may be an operation that takes the absolute value difference between barcode image data (I1) and alternative barcode image data (I2).

As discussed above, in some examples, comparative barcode image data such as, for example, IDIFF, may be decoded to generate barcode output data. In other examples, the comparative barcode image data may be decoded by providing further operations as shown at operations 703-705. Although discussed with respect to comparative barcode image data IDIFF, operations 704-705 may be performed on any comparative barcode image data as discussed herein prior to decode.

As shown, processing may continue at operation 703, "Denoise Comparative Barcode Image Data, IDIFF", wherein the comparative barcode image data such as, for example, IDIFF or comparative barcode image data 340 or the like, may be denoised. Processing may continue from operation 703 to operation 704, "Binarize Comparative Barcode Image Data, IDIFF", where the comparative barcode image data such as, for example, IDIFF or comparative barcode image data 340 or the like, may be binarized. Processing may continue from operation 704 to operation 705, "Locate Code Areas in Comparative Barcode Image Data, IDIFF", where code areas in the comparative barcode image data such as, for example, IDIFF or comparative barcode image data 340 or the like, may be located. Processing may continue from operation 705 to operation 706, "Decode the Comparative Barcode Image Data, IDIFF, to Generate Decoded Barcode Data", where the comparative barcode image data such as, for example, IDIFF or comparative barcode image data 340 or the like, may be decoded to generate decoded barcode data.

Processing may continue from operation 706 to decision operation 707, "Decoded Barcode Data Valid?", where it may be determined whether the decoded barcode data is valid. If it is determined the decoded barcode data is valid, process 700 may continue at operation 708, "Output Decoded Barcode Data", where the decoded barcode data may be provided as output data. For example, the decoded barcode data may be provided as output data 475 or the like. If it is determined the decoded barcode data is invalid, process 700 may continue at operation 701, where operations 701-707 may be substantially repeated using different barcode image data, different pure black alternative barcode image data, or both different barcode image data and different pure black alternative barcode image data. For example, as discussed herein, image capture device 450 may capture any number barcode images and/or alternative barcode images for decoding as discussed herein.

As shown, process 700 may include a loop such that various barcode images and/or alternative barcode images may be decoded as needed to obtain valid output data as discussed. In some examples, if a threshold number of failures have occurred, a user may be notified of the failure (e.g., via a display device of system 440 (not shown)).

Figure 8:
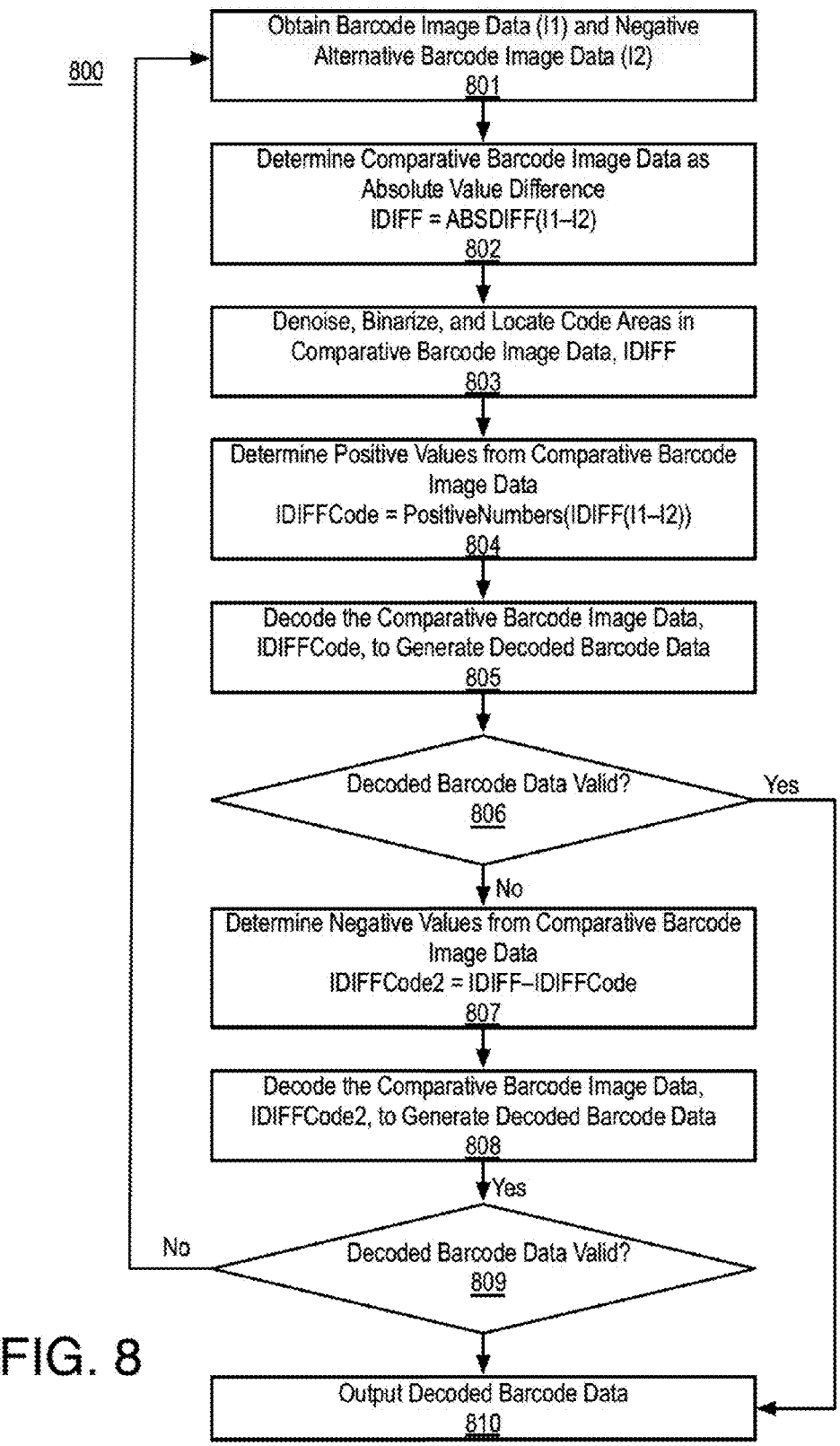
FIG. 8 is a flow chart illustrating an example process.

In another example, FIG. 8 describes operations performed with respect to decoding barcode images. FIG. 8 is a flow chart illustrating an example process, arranged in accordance with at least some implementations of the present disclosure. In some examples, process 800 may provide a computer-implemented method for decoding barcode images. In the illustrated implementation, process 800 may include one or more operations, functions or actions as illustrated by one or more of operations 801, 802, 803, 804, 805, 806, 807, 808, and/or 809. By way of non-limiting example, process 800 will be described herein with reference to operations discussed with respect to FIGS. 1-4 and 6 and example system 400 as discussed herein.

Process 800 may be utilized as a computer-implemented method for decoding barcode images. For example, process 800 may be utilized as a computer-implemented method for decoding barcode images when the alternative barcode image is a negative alternative image (e.g., a negative of the barcode image). In such examples, the barcode image may be either a black and white barcode or a color barcode, as discussed herein. Process 800 may begin at operation 701, "Obtain Barcode Image Data (I1) and Negative Alternative Barcode Image Data (I2)", where barcode image data and negative alternative barcode image data may be obtained. For example, barcode image 110 and alternative barcode image 120 may be captured via image capture device 450 to generate captured barcode image data 310 and captured alternative barcode image data 320. As discussed, in various examples, barcode image data 310 and captured alternative barcode image data 320 may include noise due to a variety of factors as discussed herein.

Processing may continue from operation 801 to operation 802, "Determine Comparative Barcode Image Data as Absolute Value Difference IDIFF=ABSDIFF(I1−I2)", where comparative barcode image data may be determined. For example, barcode decode module 470 may perform operation 330 on captured barcode image data 310 and captured alternative barcode image data 320 to generate comparative barcode image data 340 such that operation 330 includes an absolute value difference given as IDIFF=ABSDIFF(I1−I2), where IDIFF may be the comparative barcode image data and ABSDIFF may be an operation that takes the absolute value difference between barcode image data (I1) and alternative barcode image data (I2).

As discussed above, in some examples, comparative barcode image data such as, for example, IDIFF, may be decoded to generate barcode output data. In other examples, the comparative barcode image data may be decoded by providing further operations as shown at operation 803 and as discussed above with respect to operations 703-705. As shown, processing may continue at operation 803, "Denoise, Binarize, and Locate Code Areas in Comparative Barcode Image Data. IDIFF", where the comparative barcode image data such as, for example, IDIFF or comparative barcode image data 340 or the like, may be denoised and binarized, and where code areas in the comparative barcode image data may be located.

Processing may continue from operation 803 to operation 804, "Determine Positive Values from Comparative Barcode Image Data IDIFFCode=PositiveNumbers(IDIFF(I1−I2))", where comparative barcode image data may be determined. For example, barcode decode module 470 may perform operation 330 on captured barcode image data 310 and captured alternative barcode image data 320 or on processed comparative barcode image data IDIFF to generate comparative barcode image data 340 such that operation 330 includes determining positive numbers from a subtraction of the alternative barcode image data from the barcode image data given as IDIFFCode=PositiveNumbers(IDIFF(I1−I2)), where IDIFFCode may be the comparative barcode image data and PositiveNumbers may be an operation that determines positive numbers from a subtraction operations (and may set negative values to zero, in some examples).

Processing may continue from operation 804 to operation 805, "Decode the Comparative Barcode Image Data, IDIFFCode, to Generate Decoded Barcode Data", where the comparative barcode image data such as, for example, IDIFFCode or comparative barcode image data 340 or the like, may be decoded to generate decoded barcode data.

Processing may continue from operation 805 to decision operation 806, "Decoded Barcode Data Valid?", where it may be determined whether the decoded barcode data is valid. If it is determined the decoded barcode data is valid, process 800 may continue at operation 810, "Output Decoded Barcode Data", where the decoded barcode data may be provided as output data. For example, the decoded barcode data may be provided as output data 475 or the like.

If it is determined the decoded barcode data is invalid, process 800 may continue at operation 807, "Determine Negative Values from Comparative Barcode Image Data IDIFFCode2=IDIFF−IDIFFCode", where comparative barcode image data may be determined. For example, barcode decode module 470 may perform operation 330 on captured barcode image data 310 and captured alternative barcode image data 320 or on processed comparative barcode image data. IDIFF and IDIFFCode to generate comparative barcode image data 340 such that operation 330 includes determining negative numbers from a subtraction of the alternative barcode image data from the barcode image data given as IDIFFCode2=IDIFF−IDIFFCode, where IDIFFCode2 may be the comparative barcode image data. In other examples, at operation 807, the negative numbers (e.g., component) of the subtraction of the alternative barcode image data from the barcode image data may be represented as positive values (e.g. the negative component may be determined and used as a magnitude value). In some examples, at operation 807, the positive numbers from a subtraction of the barcode image data from the alternative barcode image data may be used to determine the magnitude of the negative component.

Processing may continue from operation 807 to operation 808, "Decode the Comparative Barcode Image Data, IDIFF-Code2, to Generate Decoded Barcode Data", where the comparative barcode image data such as, for example, IDIFFCode or comparative barcode image data 340 or the like, may be decoded to generate decoded barcode data. Processing may continue from operation 808 to decision operation 809, "Decoded Barcode Data Valid?", where it may be determined whether the decoded barcode data is valid. If it is determined the decoded barcode data is valid, process 800 may continue at operation 810, "Output Decoded Barcode Data", where the decoded barcode data may be provided as output data as discussed.

If it is determined the decoded barcode data is invalid, process 800 may continue at operation 701, where operations 801-809 may be substantially repeated using different barcode image data, different negative alternative barcode image data, or both different barcode image data and different negative alternative barcode image data. For example, as discussed herein, image capture device 450 may capture any number barcode images and/or alternative barcode images for decoding as discussed herein.

As shown, process 800 may include a loop such that various barcode images and/or alternative barcode images may be decoded as needed to obtain valid output data as discussed. In some examples, if a threshold number of failures have occurred, a user may be notified of the failure (e.g., via a display device of system 440 not shown)).

In some examples, processes 500, 600, 700 and/or 800 may provide for presenting and decoding barcode images as discussed herein. Processes 500, 600, 700 and/or 800 may be repeated any number of times either in serial or in parallel, as needed. Furthermore, processes 500, 600, 700 and/or process 800 may be implemented via hardware, software, firmware, or a combination thereof, as is discussed further herein.

The techniques discussed herein may provide improved accuracy and decode success rate for communicating barcode images. For example, in tests with strong reflections, accurate decode rates improved from about 17% with no alternative image to about 97% when using an alternative image and the described techniques. In tests with both strong reflections and color shifts, accuracy decode rates improved from about 0% with no alternative image to about 71% when using an alternative image and the described techniques.

Further, the techniques described herein may be combined with other techniques to improved decoding. In some examples, movement between a barcode image and an alternative barcode image may be detected and corrected for using various techniques such as, for example, descriptor matching techniques. Further, in some examples, the techniques discussed herein may be used in combination with standard techniques providing decoding using only a barcode image. For example, the techniques discussed herein may be performed upon a failure of decoding using only the barcode image or failed areas of the barcode image may be successfully decoded using the discussed techniques, or the like.

Some additional and/or alternative details related to processes 500, 600, 700 and/or 800 and or system 400 may be illustrated in one or more examples of implementations discussed in greater detail below.

Figure 9:
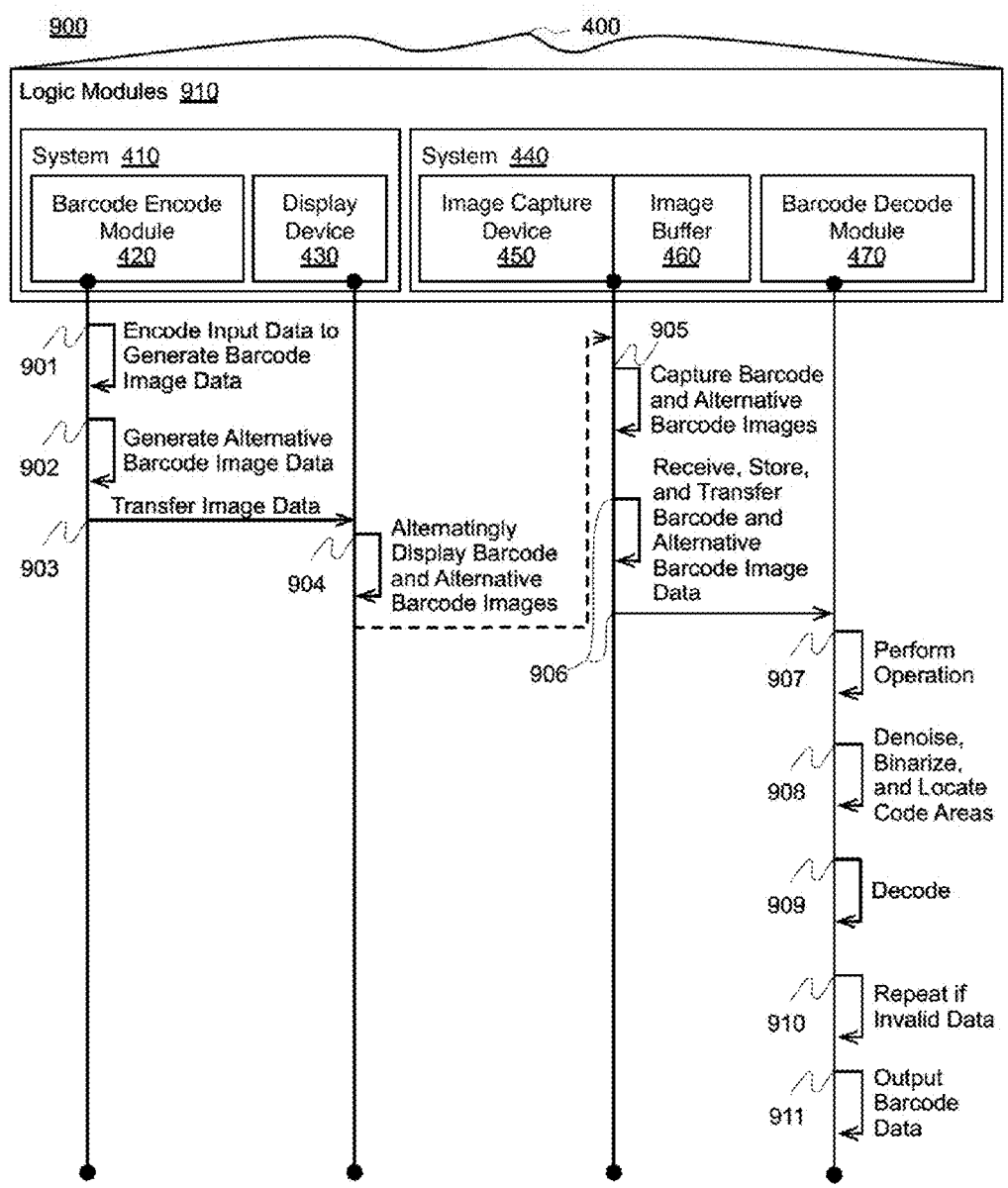
FIG. 9 is an illustrative diagram of an example system and process for providing optical communication using differential images.

FIG. 9 is an illustrative diagram of example system 400 and process 900 for encoding and displaying a barcode image and an alternative barcode image and for capturing and decoding the barcode image and the alternative barcode image, arranged in accordance with at least some implementations of the present disclosure. In the illustrated implementation, process 900 may include one or more operations, functions or actions as illustrated by one or more of operations 901, 902, 903, 904, 905, 906, 907, 908, 909, 910, and/or 911. By way of non-limiting example, process 900 also will be described herein with reference to example system 400 as discussed herein.

In the illustrated implementation, system 400 may include logic modules 910, the like, and/or combinations thereof. For example, logic modules 910, may include system 410, which may include barcode encode module 420 and/or display device 430 and system 440, which may include image capture device 450, image buffer 460, and/or barcode decode module 470, the like, and/or combinations thereof. In various examples, system 410 and system 440 may be implemented separately as discussed herein.

Barcode encode module 420, for example, may be configured to encode input data to generate barcode image data and/or generate alternative barcode image data associated with the barcode image data. Display device 430, for example, may be configured to alternatingly display a barcode image associated with the barcode image data and an alternative barcode image associated with the alternative barcode image data.

Image capture device 450, for example, may be configured to capture a barcode image to generate barcode image data and/or capture an alternative barcode image different than the barcode image to generate alternative barcode image data. Image buffer 460, for example, may be configured to. Barcode decode module 470, for example, may be configured to perform an operation on the barcode image data and the alternative barcode image data to generate comparative barcode image data, generate barcode output data based at least in part on a decode of the comparative barcode image data, and/or transmit the barcode output data.

Process 900 may be utilized as a computer-implemented method for providing barcode communication. Process 900 may begin at operation 901, "Encode Input Data to Generate Barcode Image Data", where input data may be encoded to generate barcode image data. For example, input data 415 may be encoded by barcode encode module 420 to generate barcode image data. Input data 415 may include any data suitable for encoding in a barcode image such as text data or the like.

Processing may continue from operation 901 to operation 902, "Generate Alternative Barcode Image Data", where alternative barcode image data associated with the barcode image data may be generated. For example, the alternative barcode image data may be different than and complementary to the barcode image data. For example, barcode encode module 420 may generate alternative barcode image data 427.

Processing may continue from operation 902 to operation 903, "Transfer Image Data", where barcode image data and/or alternative barcode image data may be transferred from barcode encode module 420 to display device 430. In some examples, barcode image data and/or alternative barcode image data may be transferred via an image buffer or the like.

Processing may continue from operation 903 to operation 904, "Alternatingly Display Barcode and Alternative Barcode Images", where a barcode image associated with the barcode image data and an alternative barcode image associated with the alternative barcode image data may be alternatingly displayed via a display device. For example, barcode image 110 and alternative barcode image 120, 220 may be alternatingly displayed via display device 430 as discussed herein.

In some examples, operations 901, 902, 903, and/or 904 may provide for generating barcode images. For example, barcode images and alternative barcode images may be generated and displayed via system 410.

Processing may continue from operation 904 to operation 905, "Capture Barcode and Alternative Barcode Images", where a barcode image and an alternative barcode image may be captured to generate barcode image data and alternative barcode image data, respectively. For example, barcode image 110 and alternative barcode image 120, 220 may be captured by image capture device 450 to generate captured barcode image data 310 and captured alternative barcode image data 320.

Processing may continue from operation 905 to operation 906, "Receive, Store, and Transfer Barcode and Alternative Barcode Image Data", where the barcode image data and the alternative barcode image data may be received, stored and transferred. For example, image buffer 460 may receive captured barcode image data 310 and captured alternative barcode image data 320 from image capture device 450, store captured barcode image data 310 and captured alternative barcode image data 320, and transfer captured barcode image data 310 and captured alternative barcode image data 320 to barcode decode module 470.

Processing may continue from operation 906 to operation 907, "Perform Operation", where an operation may be performed on the barcode image data and the alternative barcode image data. For example, barcode decode module 470 may perform operation 330 on captured barcode image data 310 and captured alternative barcode image data 320 to generate comparative barcode image data 340 as discussed herein.

Processing may continue from operation 907 to operation 908, "Denoise, Binarize, and Locate Code Areas", where the comparative barcode image data may be denoised and binarized and where code areas may be located in the comparative barcode image data Processing may continue from operation 908 to operation 909, "Decode", where the comparative barcode image data may be decoded. For example, barcode decode module 470 may decode comparative barcode image data 340.

Processing may continue from operation 909 to operation 910, "Repeat if Invalid Data", where it may be determined whether the decoded barcode data is valid. If the decoded barcode data is valid, process 900 may continue at operation 911, "Output Barcode Data" where the data may be provided or transmitted as output data 475, for example. If the decoded barcode data is valid, any of operations 907, 908, and/or 909 may be repeated either with the same or different on different barcode image data and/or alternative barcode image data or with the same operation on the same barcode image data and/or alternative barcode image data.

In some examples, operations 905, 906, 907, 908, 909, 910, and/or 911 may provide for decoding barcode images. Such decoding, may be performed at a consumer's mobile device, for example.

Process 900 may be repeated any number of times either in serial or in parallel, as needed. Furthermore, in general, barcode encode module 420 and/or barcode decode module 470 may be implemented via hardware, software, and/or firmware. In various examples, barcode encode module 420 and/or barcode decode module 470 may be implemented via a processing unit such as, for example, a graphics processing unit or a central processing unit, or the like.

While implementation of example processes 500, 600, 700, 800, 900 and other processes discussed herein may include the undertaking of all operations shown in the order illustrated, the present disclosure is not limited in this regard and, in various examples, implementation of the processes discussed herein may include the undertaking only a subset of the operations shown and/or in a different order than illustrated.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the operations or operations discussed herein.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
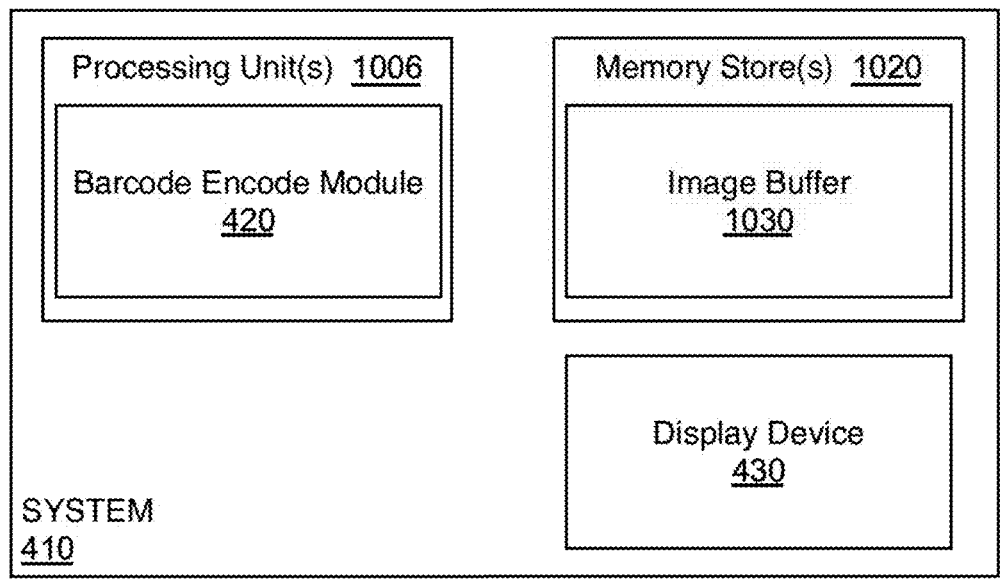
FIG. 10 is an illustrative diagram of an example system for optical communication using differential images.
Figure 10:
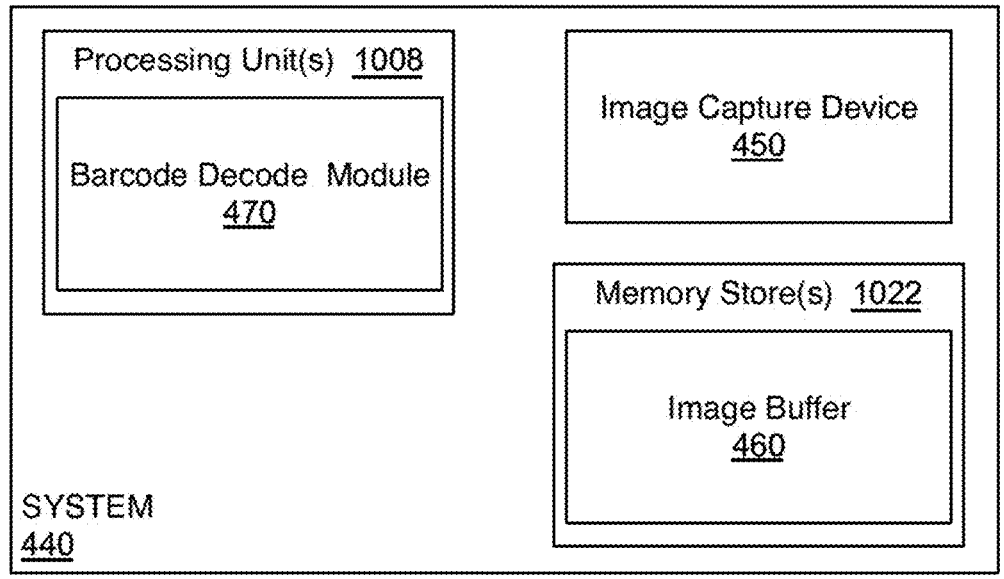

FIG. 10 is an illustrative diagram of example system for encoding and displaying a barcode image and an alternative barcode image and for capturing and decoding the barcode image and the alternative barcode image, arranged in accordance with at least some implementations of the present disclosure. In the illustrated implementation, system 400 may include system 410 which may include one or more processing units 1006, one or more memory stores 1020, an image buffer 1030 and/or display device 430, and system 440, which may include one or more processing units 1008, one or more memory stores 1022, image buffer 420 and/or image capture device 450.

As discussed above, in some examples, system 410 and system 440 may be implemented separately. Central processing units 1006, memory stores 1020, and/or display device 430 may be capable of communication with one another, via, for example, a bus or other access. In various implementations, display device 430 may be integrated in system 410 or implemented separately from system 410. Similarly, central processing units 1008, memory stores 1022, and/or image capture device 450 may be capable of communication with one another, via, for example, a bus or other access. In various implementations, image capture device 450 may be integrated in system 440 or implemented separately from system 440.

As shown in FIG. 10, and discussed above, barcode encode module 420 may be implemented via processing unit(s) 1006. In various examples, processing unit(s) 1006 may include a central processing unit or units or a graphics processing unit or units. As shown, processing unit(s) 1006 may be communicatively coupled to memory stores 1020. Also as shown, image buffer 1030 may be implemented via memory stores 1020. Processing unit(s) 1006 may also be communicative coupled to display device 430. Barcode encode module 420 may be configured to encode input data to generate barcode image data and/or to generate alternative barcode image data associated with barcode image data, as discussed herein. Display device 430 may be configured to alternatingly display a barcode image associated with the barcode image data and a alternative barcode image associated with the alternative barcode image data, as discussed herein.

Also as shown in FIG. 10, and discussed above, barcode decode module 470 may be implemented via processing unit(s) 1008. In various examples, processing unit(s) 1008 may include a central processing unit or units or a graphics processing unit or units. As shown, processing milks) 1008 may be communicatively coupled to memory stores 1022. Also as shown, image buffer 460 may be implemented via memory stores 1022. Processing unit(s) 1008 may also be communicative coupled to image capture device 450. Image capture device 450 may be configured to capture a barcode image to generate barcode image data and/or capture an alternative barcode image different than the barcode image to generate alternative barcode image data, as discussed herein. Barcode decode module 470 may be configured to perform an operation on the barcode image data and the alternative barcode image data to generate comparative barcode image data, generate barcode output data based at least in part on a decode of the comparative barcode image data, and/or transmit the barcode output data, as discussed herein.

As will be appreciated, the modules illustrated in FIG. 10 may include a variety of software and/or hardware modules and/or modules that may be implemented via software and/or hardware. For example, the modules may be implemented as software via processing unit(s) 1006 and/or 1008. Furthermore, the shown memory stores 1020, 1022 may be shared memory for processing units 1006, 1008, respectively, for example. Also, system 410 or system 440 may be implemented in a variety of ways. For example, system 410 (excluding display device 430) may be implemented as a single chip or device having a graphics processor, a quad-core central processing unit, on-board cache, and a memory controller input/output (I/O) module (not shown). In other examples, system 410 (again excluding display device 430) may be implemented as a chipset. In another example, system 440 (excluding image capture device 450) may be implemented as a single chip or device having a graphics processor, a quad-core central processing unit, on-board cache, and a memory controller input/output (I/O) module (not shown). In other examples, system 440 (again excluding image capture device 450) may be implemented as a chipset.

Processing units 1006 or 1008 may include any suitable implementations including, for example, microprocessor(s), multicore processors, application specific integrated circuits, chip(s), chipsets, graphics processors, or the like. In addition, memory stores 1020 or 1022 and/or image buffers 1030 or 460 1340 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1020 or 1022 and/or image buffers 1030 or 460 1340 may be implemented via cache memory. In various examples, system 410 or system 440 may be implemented as a chipset or as a system on a chip.

Figure 11:
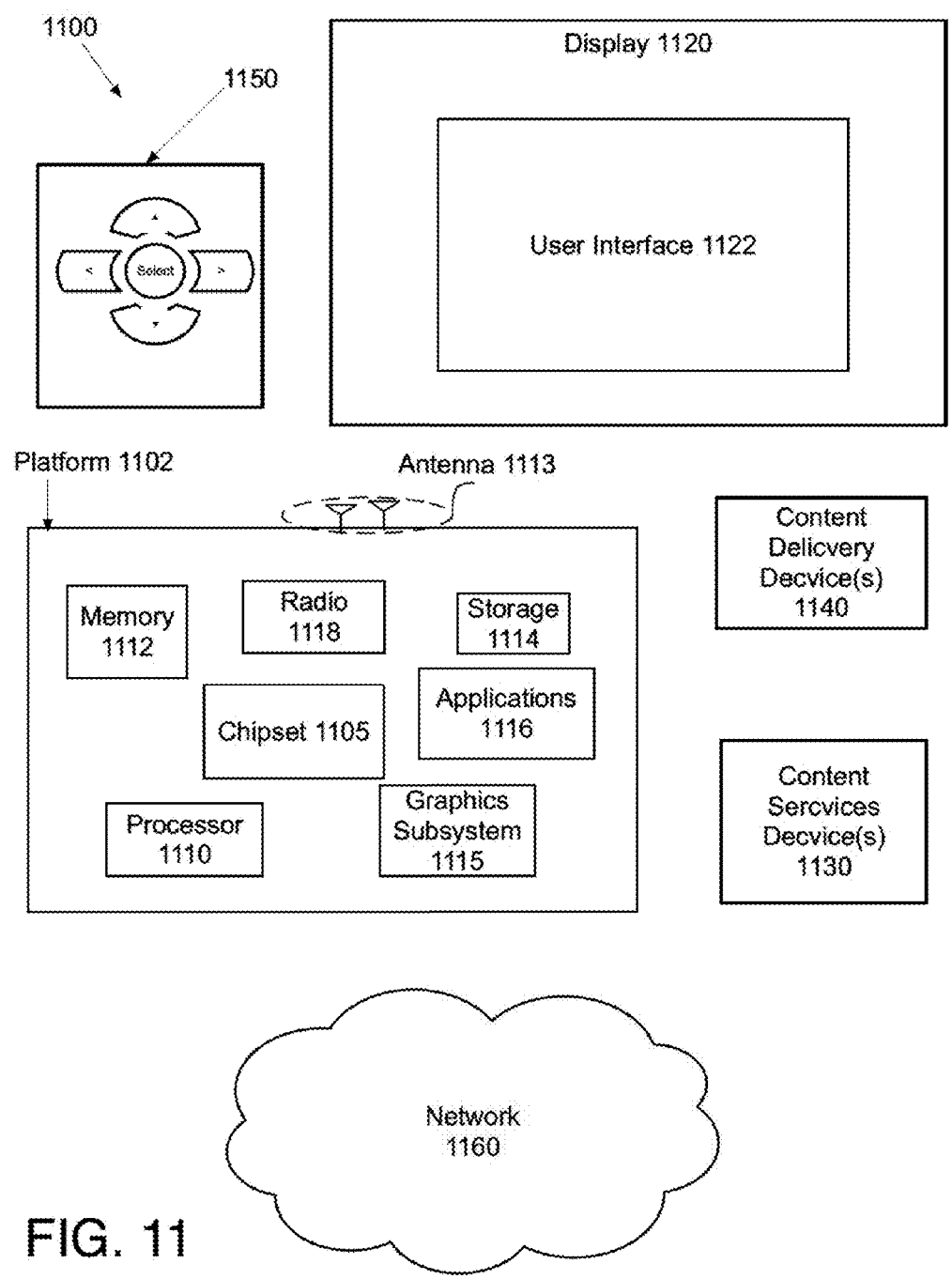
FIG. 11 is an illustrative diagram of an example system.

FIG. 11 illustrates an example system 1100 in accordance with the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example.

In embodiments, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off" In addition, chipset 1105 may include hardware and/or software support for 7.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RE spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content Meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
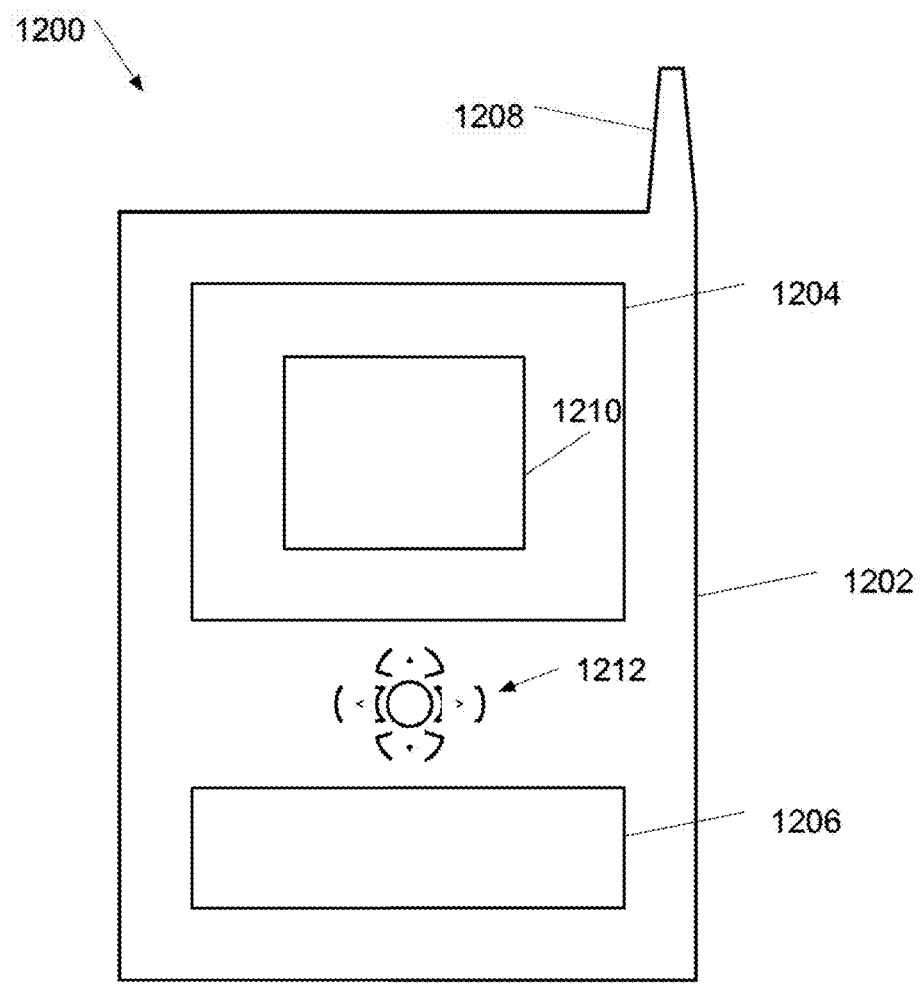
FIG. 12 illustrates an example device, all arranged in accordance with at least some implementations of the present disclosure.

As described above, system 1100 may be embodied in varying physical styles or form factors. FIG. 12 illustrates implementations of a small form factor device 1200 in which system 1200 may be embodied. In embodiments, for example, device 1200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing 1202, a display 1204, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional embodiments.

In one example, a computer-implemented method for decoding barcode images may include capturing a barcode image to generate barcode image data, capturing an alternative barcode image different than the barcode image to generate alternative barcode image data such that the alternative barcode image data is associated with the barcode image data, performing an operation on the barcode image data and the alternative barcode image data to generate comparative barcode image data, and generating barcode output data based at least in part on decoding the comparative barcode image data.

In further examples of a computer-implemented method for decoding barcode images, the method may include applying a denoise operation to the comparative barcode image data, binarizing the comparative barcode image data on one or more channels of the comparative barcode image data, such that the one or more channels include at least one of a black and white channel, a red channel, a green channel, or a blue channel, locating code areas in the comparative barcode image data, decoding the comparative barcode image data to generate decoded barcode data, determining whether the decoded barcode data is valid, providing the barcode output data when it is determined the decoded barcode data is valid, and when it is determined the decoded barcode data is invalid: performing a second operation on the barcode image data and the alternative barcode image data to generate second comparative barcode image data and generating alternative barcode output data based at least in part on the second comparative barcode image data. Performing the operation on the barcode image data and the alternative barcode image data to generate the comparative barcode image data may include at least one of adding the barcode image data and the alternative barcode image data, multiplying the barcode image data and the alternative barcode image data, taking an absolute value difference between the barcode image data and the alternative barcode image data, subtracting the barcode image data from the alternative barcode image data, determining positive numbers from a subtraction of the alternative barcode image data from the barcode image data, or determining positive numbers from a subtraction of the barcode image data from the alternative barcode image data. The barcode image may include at least one of a one-dimensional barcode image, a two-dimensional barcode image, a dynamic barcode image, a black and white barcode image, or a color barcode image. The barcode image data and the alternative barcode image data may be complementary barcode image data. The alternative barcode image may include at least one of a pure black image or a negative of the barcode image. The alternative barcode image may include the pure black image and performing the operation on the barcode image data and the alternative barcode image data may include taking the absolute value difference between the barcode image data and the alternative barcode image data. The alternative barcode image may include the negative of the barcode image and performing the operation on the barcode image data and the alternative barcode image data may include determining positive numbers from a subtraction of the alternative barcode image data from the barcode image data and performing the second operation on the barcode image data and the alternative barcode image data may include determining positive numbers from a subtraction of the barcode image data from the alternative barcode image data. Capturing the barcode image and capturing the alternative barcode image may include capturing at a capture frequency such that the capture frequency may include at least one of 20 frames per second, 25 frames per second, or twice a display frequency. Capturing the barcode image and capturing the alternative barcode image may include capturing the barcode image and the alternative barcode image from a same area of a display device.

In another example, a computer-implemented method for generating barcode images may include encoding input data to generate barcode image data, generating alternative barcode image data associated with the barcode image data such that the alternative barcode image data is different than and complementary to the barcode image data, and alternatingly displaying a barcode image associated with the barcode image data and an alternative barcode image associated with the alternative barcode image data via a display device.

In further examples of a computer-implemented method for generating barcode images, the barcode image and the alternative barcode image may include static barcode images and alternatingly displaying the barcode image and the alternative barcode image may include alternating display of the barcode image and the alternative barcode image on a same area of the display device. The barcode image and the alternative barcode image may include dynamic barcode images of a dynamic barcode having a plurality of images such that alternatingly displaying the barcode image and the alternative barcode image may include at least one of displaying the barcode image, displaying the alternative barcode image, and subsequently displaying remaining images of the plurality of images on the same area of the display device or displaying the barcode image, displaying one or more images associated with remaining images of the plurality of images, and subsequently displaying the alternative barcode image on the same area of the display device. Alternatingly displaying the barcode image and the alternative barcode image may include displaying at a display frequency such that the display frequency comprises at least one of 10 frames per second or one half of a capture frequency. The barcode image may include at least one of a one-dimensional barcode image, a two-dimensional barcode image, a dynamic barcode image, a black and white barcode image, or a color barcode image. The alternative barcode image include at least one of a pure black image or a negative of the barcode image.

In another example, a system for providing barcode communication on a computer may include an image capture device configured to capture a barcode image to generate barcode image data and capture an alternative barcode image different than the barcode image to generate alternative barcode image data such that the alternative barcode image data is associated with the barcode image, and a processing unit having a barcode decode module such that the processing unit is communicatively coupled to the image capture device and the barcode decode module is configured to perform an operation on the barcode image data and the alternative barcode image data to generate comparative barcode image data, generate barcode output data based at least in part on a decode of the comparative barcode image data, and transmit the barcode output data.

In other examples of systems for providing barcode communication on a computer, the system may include an image buffer such that the processing unit is communicatively coupled to the image buffer, the processing unit is communicatively coupled to the image capture device via the image buffer, and the image buffer is configured to receive the barcode image data and the alternative barcode image data from the image capture device, store the barcode image data and the alternative barcode image data, and transmit the barcode image data and the alternative barcode image data to the processing unit, a second processing unit comprising a barcode encode module configured to encode input data to generate the barcode image data and generate the alternative barcode image data associated with the barcode image data such that the alternative barcode image data is different than and complementary to the barcode image data, and a display device communicatively coupled to the second processing unit such that the display device is configured to apply a denoise operation to the comparative barcode image data, binarize the comparative barcode image data on one or more channels of the barcode image data such that the one or more channels include at least one of a black and white channel, a red channel, a green channel, or a blue channel, locate code areas in the comparative barcode image data, decode the comparative barcode image data to generate decoded barcode data, determine whether the decoded barcode data is valid, provide the barcode output data when it is determined the decoded barcode data is valid and when it is determined the decoded barcode data is invalid: perform a second operation on the barcode image data and the alternative barcode image data to generate second comparative barcode image data and generate barcode output data based at least in part on the second comparative barcode image data. The operation on the barcode image data and the alternative barcode image data to generate comparative barcode image data may include at least one of an addition of the barcode image data and the alternative barcode image data, a multiplication of the barcode image data and the alternative barcode image data, an absolute value difference between the barcode image data and the alternative barcode image data, a subtraction of the barcode image data from the alternative barcode image data, a determination of positive numbers from a subtraction of the alternative barcode image data from the barcode image data, or a determination of positive numbers from a subtraction of the barcode image data from the alternative barcode image data. The barcode image may include at least one of a one-dimensional barcode image, a two-dimensional barcode image, a dynamic barcode image, a black and white barcode image, or a color barcode image. The barcode image data and the alternative barcode image data may be complementary barcode image data. The alternative barcode image may include at least one of a pure black image or a negative of the barcode image. The alternative barcode image may include the pure black image and performing the operation on the barcode image data and the alternative barcode image data may include taking the absolute value difference between the barcode image data and the alternative barcode image data. The alternative barcode image may include the negative of the barcode image and performing the operation on the barcode image data and the alternative barcode image data may include determining positive numbers from a subtraction of the alternative barcode image data from the barcode image data and performing the second operation on the barcode image data and the alternative barcode image data may include determining positive numbers from a subtraction of the barcode image data from the alternative barcode image data. Capturing the barcode image and capturing the alternative barcode image may include capturing at a capture frequency such that the capture frequency may include at least one of 20 frames per second, 25 frames per second, or twice a display frequency. Capturing the barcode image and capturing the alternative barcode image may include capturing the barcode image and the alternative barcode image from a same area of a display device.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for decoding barcode images comprising:
   capturing, by an image capture device, a barcode image to generate barcode image data;
   capturing, by the image capture device, an alternative barcode image different than the barcode image to generate alternative barcode image data, wherein the alternative barcode image data is associated with the barcode image data;
   performing, by a processor, an operation on the barcode image data and the alternative barcode image data to generate comparative barcode image data; and
   generating, by the processor, barcode output data based at least in part on decoding the comparative barcode image data.

2. The method of claim 1, wherein the barcode image comprises at least one of a one-dimensional barcode image, a two-dimensional barcode image, a dynamic barcode image, a black and white barcode image, or a color barcode image.

3. The method of claim 1, wherein the alternative barcode image comprises the pure black image and wherein performing the operation on the barcode image data and the alternative barcode image data comprises taking the absolute value difference between the barcode image data and the alternative barcode image data.

4. The method of claim 1, wherein the alternative barcode image comprises the negative of the barcode image and wherein performing the operation on the barcode image data and the alternative barcode image data comprises determining positive numbers from a subtraction of the alternative barcode image data from the barcode image data.

5. The method of claim 1, wherein performing the operation on the barcode image data and the alternative barcode image data to generate the comparative barcode image data comprises at least one of adding the barcode image data and the alternative barcode image data, multiplying the barcode image data and the alternative barcode image data, taking an absolute value difference between the barcode image data and the alternative barcode image data, subtracting the barcode image data from the alternative barcode image data, determining positive numbers from a subtraction of the alternative barcode image data from the barcode image data, or determining positive numbers from a subtraction of the barcode image data from the alternative barcode image data.

6. The method of claim 1, wherein generating the barcode output data comprises:
   applying a denoise operation to the comparative barcode image data;
   binarizing the comparative barcode image data on one or more channels of the comparative barcode image data, wherein the one or more channels comprise at least one of a black and white channel, a red channel, a green channel, or a blue channel;
   locating code areas in the comparative barcode image data;
   decoding the comparative barcode image data to generate decoded barcode data;
   determining whether the decoded barcode data is valid;
   providing the barcode output data when it is determined the decoded barcode data is valid; and
   when it is determined the decoded barcode data is invalid:
      performing a second operation on the barcode image data and the alternative barcode image data to generate second comparative barcode image data; and
      generating alternative barcode output data based at least in part on the second comparative barcode image data.

7. A system for providing barcode communication on a computer, comprising:
   an image capture device configured to:
      capture a barcode image to generate barcode image data; and
      capture an alternative barcode image different than the barcode image to generate alternative barcode image data, wherein the alternative barcode image data is associated with the barcode image;
   a processing unit comprising a barcode decode module, wherein the processing unit is communicatively coupled to the image capture device and wherein the barcode decode module is configured to:
      perform an operation on the barcode image data and the alternative barcode image data to generate comparative barcode image data;
      generate barcode output data based at least in part on a decode of the comparative barcode image data; and
      transmit the barcode output data.

8. The system of claim 7, wherein the barcode image comprises at least one of a one-dimensional barcode image, a two-dimensional barcode image, a dynamic barcode image, a black and white barcode image, or a color barcode image.

9. The system of claim 7, wherein the alternative barcode image comprises the pure black image and wherein the operation on the barcode image data and the alternative barcode image data comprises the absolute value difference between the barcode image data and the alternative barcode image data.

10. The system of claim 7, wherein the alternative barcode image comprises the negative of the barcode image and wherein the operation on the barcode image data and the alternative barcode image data comprises the determination of positive numbers from a subtraction of the alternative barcode image data from the barcode image data.

11. The system of claim 7, further comprising:
a second processing unit comprising a barcode encode module, wherein the barcode encode module is configured to:
encode input data to generate the barcode image data; and
generate the alternative barcode image data associated with the barcode image data, wherein the alternative barcode image data is different than and complementary to the barcode image data; and
a display device communicatively coupled to the second processing unit, wherein the display device is configured to:
alternatingly display the barcode image associated with the barcode image data and the alternative barcode image associated with the alternative barcode image data.

12. The system of claim 7, wherein the operation on the barcode image data and the alternative barcode image data to generate comparative barcode image data comprises at least one of an addition of the barcode image data and the alternative barcode image data, a multiplication of the barcode image data and the alternative barcode image data, an absolute value difference between the barcode image data and the alternative barcode image data, a subtraction of the barcode image data from the alternative barcode image data, a determination of positive numbers from a subtraction of the alternative barcode image data from the barcode image data, or a determination of positive numbers from a subtraction of the barcode image data from the alternative barcode image data.

13. The system of claim 7, wherein the barcode decode module being configured to generated the barcode output data comprises the barcode decode module being configured to:
apply a denoise operation to the comparative barcode image data;
binarize the comparative barcode image data on one or more channels of the barcode image data, wherein the one or more channels comprise at least one of a black and white channel, a red channel, a green channel, or a blue channel;
locate code areas in the comparative barcode image data;
decode the comparative barcode image data to generate decoded barcode data;
determine whether the decoded barcode data is valid;
provide the barcode output data when it is determined the decoded barcode data is valid; and
when it is determined the decoded barcode data is invalid:
perform a second operation on the barcode image data and the alternative barcode image data to generate second comparative barcode image data; and
generate barcode output data based at least in part on the second comparative barcode image data.

14. At least one non-transitory machine readable medium comprising a plurality of instructions that in response to being executed on a computing device, cause the computing device to decode barcode images by:
capturing a barcode image to generate barcode image data;
capturing an alternative barcode image different than the barcode image to generate alternative barcode image data, wherein the alternative barcode image data is associated with the barcode image data;
performing an operation on the barcode image data and the alternative barcode image data to generate comparative barcode image data; and
generating barcode output data based at least in part on decoding the comparative barcode image data.

15. The machine readable medium of claim 14, wherein the barcode image comprises at least one of a one-dimensional barcode image, a two-dimensional barcode image, a dynamic barcode image, a black and white barcode image, or a color barcode image.

16. The machine readable medium of claim 14, wherein the alternative barcode image comprises the pure black image and wherein performing the operation on the barcode image data and the alternative barcode image data comprises taking the absolute value difference between the barcode image data and the alternative barcode image data.

17. The machine readable medium of claim 14, wherein the alternative barcode image comprises the negative of the barcode image and wherein performing the operation on the barcode image data and the alternative barcode image data comprises determining positive numbers from a subtraction of the alternative barcode image data from the barcode image data.

18. The machine readable medium of claim 14, wherein performing the operation on the barcode image data and the alternative barcode image data to generate the comparative barcode image data comprises at least one of adding the barcode image data and the alternative barcode image data, multiplying the barcode image data and the alternative barcode image data, taking an absolute value difference between the barcode image data and the alternative barcode image data, subtracting the barcode image data from the alternative barcode image data, determining positive numbers from a subtraction of the alternative barcode image data from the barcode image data, or determining positive numbers from a subtraction of the barcode image data from the alternative barcode image data.

19. The machine readable medium of claim 14, wherein generating the barcode output data comprises:
applying a denoise operation to the comparative barcode image data;
binarizing the comparative barcode image data on one or more channels of the comparative barcode image data, wherein the one or more channels comprise at least one of a black and white channel, a red channel, a green channel, or a blue channel;
locating code areas in the comparative barcode image data;
decoding the comparative barcode image data to generate decoded barcode data;
determining whether the decoded barcode data is valid;
providing the barcode output data when it is determined the decoded barcode data is valid; and
when it is determined the decoded barcode data is invalid:
performing a second operation on the barcode image data and the alternative barcode image data to generate second comparative barcode image data; and
generating alternative barcode output data based at least in part on the second comparative barcode image data.

* * * * *